United States Patent
Cobos et al.

(10) Patent No.: US 8,661,193 B1
(45) Date of Patent: Feb. 25, 2014

(54) DISK DRIVE WITH PARTIAL SECTOR MANAGEMENT

(75) Inventors: Bret E. Cobos, Trabuco Canyon, CA (US); Sang Huynh, Yorba Linda, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 520 days.

(21) Appl. No.: 12/960,386

(22) Filed: Dec. 3, 2010

Related U.S. Application Data

(60) Provisional application No. 61/408,483, filed on Oct. 29, 2010.

(51) Int. Cl.
*G06F 12/00* (2006.01)
*G06F 13/00* (2006.01)

(52) U.S. Cl.
USPC ........... 711/112; 711/100; 711/101; 711/154; 711/155; 711/156; 711/221

(58) Field of Classification Search
USPC .......... 711/100, 101, 112, 154, 155, 156, 221
See application file for complete search history.

(56) References Cited

U.S. PATENT DOCUMENTS

| | | | |
|---|---|---|---|
| 5,418,940 A | 5/1995 | Mohan | |
| 5,797,022 A | 8/1998 | Shimotono et al. | |
| 5,895,488 A | 4/1999 | Loechel | |
| 6,191,712 B1 | 2/2001 | Still | |
| 6,412,045 B1 | 6/2002 | DeKoning et al. | |
| 6,754,860 B2 | 6/2004 | Kim et al. | |
| 6,924,952 B1 | 8/2005 | Brunnett et al. | |
| 6,925,526 B2 * | 8/2005 | Hall | 711/113 |
| 7,076,605 B1 | 7/2006 | Son | |
| 7,080,200 B2 | 7/2006 | Hassner et al. | |
| 7,277,986 B2 | 10/2007 | Morley et al. | |
| 7,574,558 B2 | 8/2009 | Morley et al. | |
| 7,870,446 B2 | 1/2011 | Kurashige | |
| 2008/0005465 A1 | 1/2008 | Matthews | |
| 2008/0005467 A1 | 1/2008 | Morley et al. | |
| 2009/0021853 A1 | 1/2009 | Park | |
| 2010/0011168 A1 | 1/2010 | Ryu et al. | |
| 2010/0079904 A1 | 4/2010 | Sato | |
| 2012/0137056 A1 * | 5/2012 | Keays | 711/103 |

FOREIGN PATENT DOCUMENTS

KR  0303217 B1  7/2001

* cited by examiner

*Primary Examiner* — Midys Rojas

(57) ABSTRACT

A disk drive is disclosed comprising a disk having a host addressable area and a reserved area, an exception table stored in the reserved area, a head actuated radially over the disk to write data to the disk, and control circuitry coupled to the head. The control circuitry receives a first command from the host to write first host data into a first physical sector on the disk, wherein the first host data comprises an amount of data less than a full storage capacity of the first physical sector. The control circuitry detects an uncorrectable error while reading the first physical sector during read-modify-write operation, and indicates in the exception table that the first physical sector is a partial sector including valid and invalid logical block addresses (LBAs).

26 Claims, 7 Drawing Sheets

DISK DRIVE WITH PARTIAL SECTOR MANAGEMENT

CROSS REFERENCE TO RELATED APPLICATION

This application claims priority to U.S. Application No. 61/408,483, filed Oct. 29, 2010, for "PARTIAL SECTOR MANAGEMENT", which is incorporated herein by reference.

BACKGROUND

Disk drives comprise a disk that includes data tracks with physical sectors for storing host data, where the physical sectors have a particular size, such as a 512 byte or a 4 kilobyte (4 KB) size. Traditionally, the host transfers data to the disk drive in logical block address (LBA) size units that are equal in size to the physical sectors on the disk. However, in a disparate sector size environment, where the host LBA size is smaller than the disk drive physical sector size, the host can issue a write command with less than a full physical sector amount of data. Since the disk drive can only read or write whole physical sectors, a read-modify-write operation is performed to update the physical sector with the host provided data while preserving existing data not provided with the current host write command.

However, if an uncorrectable error, such as an uncorrectable error correcting code (ECC) error, occurs during the read portion of the read-modify-write operation, the stored data in the physical sector cannot be read. As a result, the physical sector is typically written with a combination of valid data provided by the host write command and fill data, which is invalid data that can be read. Although the physical sector can now be read, not all of the LBAs in the physical sector correspond to valid host data. Thus, when the host subsequently issues a command requesting data stored in the physical sector, the disk drive must avoid transferring invalid data to the host.

DETAILED DESCRIPTION OF EMBODIMENTS OF THE INVENTION

Figure 1A:
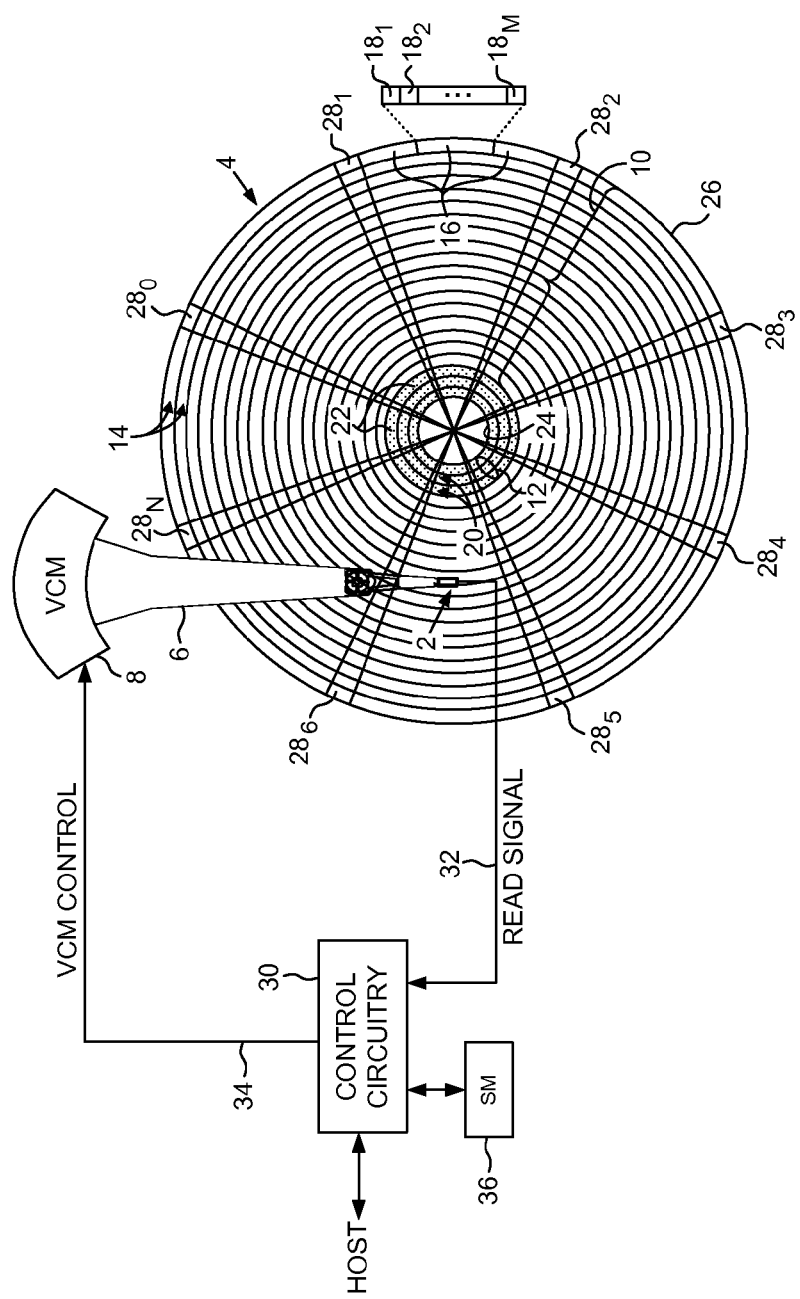
FIG. 1A shows a disk drive according to an embodiment of the present invention comprising a disk having a host addressable area and a reserved area, a head actuated over the disk, a semiconductor memory (SM), control circuitry, wherein the reserved area includes an exception table that is used for partial sector indication.

FIG. 1A shows a disk drive according to an embodiment of the present invention comprising a head 2 actuated radially over a disk 4 by an actuator arm 6, and a voice coil motor (VCM) 8 operable to rotate the actuator arm 6 about a pivot. The disk 4 comprises a host addressable area 10 and a reserved area 12. The host addressable area 10 comprises a plurality of data tracks 14, wherein each data track 14 comprises a plurality of physical sectors 16. The plurality of physical sectors 16 in the host addressable area 10 can be addressed and used by the host for reading and writing data. Each physical sector 16 corresponds to a plurality of logical block addresses (LBAs) $18_1$-$18_M$, wherein each LBA $18_1$-$18_M$ corresponds to host data stored in the physical sector 16. In one embodiment, each physical sector 16 corresponds to eight LBAs, wherein each physical sector 16 has a 4 kilobyte size and each LBA has a 512 byte size. In another embodiment, each physical sector 16 may correspond to less than eight LBAs, wherein each LBA has a size of 512 bytes. In the embodiment of FIG. 1A, the host sends and requests data corresponding to one or more LBAs, while the disk drive writes and reads data in full physical sectors, wherein each physical sector stores an amount of data corresponding to multiple LBAs.

In the embodiment of the present invention in FIG. 1A, the reserved area 12 comprises a plurality of data tracks 20, wherein each data track 20 comprises a plurality of physical sectors 22. The plurality of physical sectors 22 in reserved area 12 are not directly addressable by the host (i.e., they are hidden from the host), but can be used by the disk drive for relocation of defective physical sectors in the host addressable area 10 of the disk 4. Each physical sector 22 in reserved area 12 has a same size, such as 4 kilobytes, as each physical sector 16 in host addressable area 10. In the embodiment in FIG. 1A, the reserved area 12 is located near an inner diameter 24 of the disk 4. However, the reserved area 12 may be located at any suitable location on the disk 4, such as near an outer diameter 26 of the disk 4, or anywhere between the inner diameter 24 and the outer diameter 26 of the disk 4.

In the embodiment in FIG. 1A, the disk 4 further comprises a plurality of embedded servo sectors $28_1$-$28_N$ that define the data tracks 14 in the host addressable area 10 and the data tracks 20 in the reserved area 12. The disk drive further comprises control circuitry 30, which is operable to process a read signal 32 emanating from the head 2 to demodulate the embedded servo sectors $28_1$-$28_N$ and generate a position error signal (PES). The PES represents a radial offset of the head 2 from a target data track 14 in the host addressable area 10 or a target data track 20 in the reserved area 12. The control circuitry 30 is further operable to process the PES with a suitable servo compensator to generate a VCM control signal 34 applied to the VCM 8. The VCM 8 rotates the actuator arm 6 about the pivot in order to actuate the head 2 radially over the disk 4 in a direction that decreases the PES.

The disk drive further comprises a semiconductor memory (SM) 36 communicatively coupled to the control circuitry 30. The SM 36 can comprise, for example, dynamic random access memory (DRAM), Flash memory, or static random access memory (SRAM). The SM 36 further comprises a cache for temporarily storing write data received from the host via a write command and read data requested by the host via a read command.

Figure 1B:
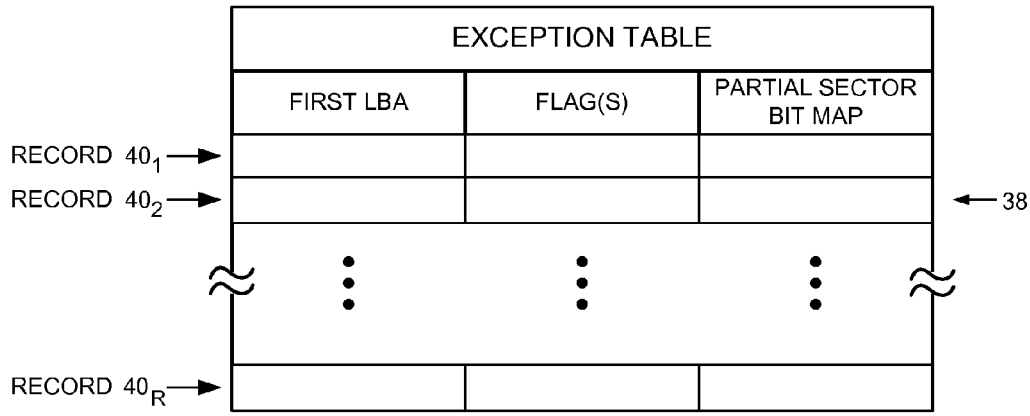
FIG. 1B shows an embodiment of the present invention comprising an exception table including a partial sector indication and a partial sector bit map for each partial sector.

The disk drive further comprises an exception table, which is illustrated in an embodiment of the invention shown in FIG. 1B. In the embodiment in FIG. 1B, the exception table 38 comprises a plurality of records $40_1$-$40_R$, wherein each record each corresponds to a physical sector 16 on the disk 4 and comprises at least one data item, such as a flag, which indicates a reason for physical sector 16 being in the exception table 38. For example, one flag may indicate that a physical sector associated with one of records $40_1$-$40_R$ is a partial sector, which refers to a physical sector that includes both valid and invalid LBAs. Another flag may indicate, for example, that a physical sector associated with one of the records $40_1$-$40_R$ is a relocated sector, which refers to a physical sector that has been relocated from the host addressable area 10 of the disk 4 to the reserved area 12 because of a defect. Another flag may indicate, for example, that a physical sector associated with one of the records $40_1$-$40_R$ comprises an uncorrectable error, such as an uncorrectable error correcting code (ECC) error.

In the embodiment of the invention shown in FIG. 1B, if one of the records $40_1$-$40_R$ in the exception table 38 identifies a physical sector on the disk 4 as a partial sector, the record also includes a partial sector bit map, which identifies each LBA in the physical sector as being valid and corresponding to valid host data or invalid and corresponding to invalid host data. In one embodiment of the invention, a valid LBA in the partial sector bit map is indicated by a set bit having a value of 1, and an invalid LBA in the partial sector bit map is indicated by a clear bit having a value of 0. However, valid and invalid LBAs in the partial sector bit map may alternatively be indicated by respective clear and set bits.

In the embodiment shown in FIG. 1B, the partial sector bit map corresponding to each partial sector is stored in the exception table 38, and the exception table 38 is stored in the reserved area 12 on the disk 4. In one embodiment, the partial sector bit map corresponding to each partial sector is not stored in the exception table 38. For example, the partial sector bit maps associated with respective partial sectors may be stored in one location in the reserved area 12 while the exception table 38 is stored in another location in the reserved area 12. Each of the records $40_1$-$40_R$ in the exception table 38 further comprises a first LBA in the associated physical sector 16 on the disk 4, wherein the first LBA in each of the records $40_1$-$40_R$ in the exception table 38 identifies the physical sector associated with that record. The initial LBA in each of the records $40_1$-$40_R$ may be either an invalid LBA, which corresponds to invalid host data, or a valid LBA, which corresponds to valid host data.

Figure 2A:
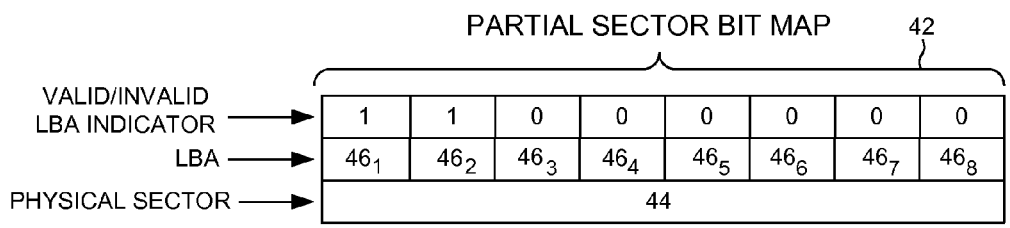
FIG. 2A shows an embodiment of the present invention comprising a partial sector bit map indicating valid and invalid logical block addresses (LBAs) associated with a physical sector on the disk.

In an embodiment of the invention shown in FIG. 2A, a partial sector bit map 42 is associated with a physical sector 44, which includes a plurality of LBAs $46_1$-$46_8$. In the partial sector bit map 42 in FIG. 2A, each of LBAs $46_1$ and $46_2$ is valid (as indicated by a set bit having a value of 1) and corresponds to valid host data, and each of LBAs $46_3$-$46_8$ is invalid (as indicated by a clear bit having a value of 0) and corresponds to invalid host data. Thus, in partial sector bit map 42 in FIG. 2A, the first LBA $46_1$ is valid.

Figure 2B:
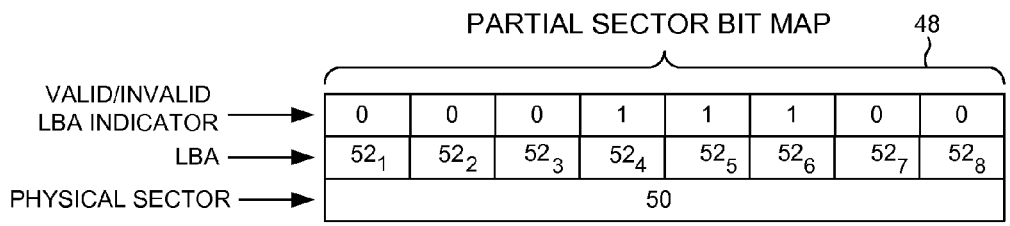
FIG. 2B shows an embodiment of the present invention comprising a partial sector bit map indicating valid and invalid LBAs associated with a physical sector on the disk.

In an embodiment of the invention shown in FIG. 2B, a partial sector bit map 48 is associated with a physical sector 50, which includes a plurality of LBAs $52_1$-$52_8$. In the partial sector bit map 48 in FIG. 2B, each of LBAs $52_1$-$52_3$ is invalid (as indicated by a clear bit having a value of 0) and corresponds to invalid host data, and each of LBAs $52_4$-$52_8$ is valid (as indicated by a clear bit having a value of 0) and corresponds to valid host data. Thus, in contrast to the partial sector bit map 42 in FIG. 2A, the first LBA $52_1$ in partial sector bit map 48 is invalid.

Figure 3A:
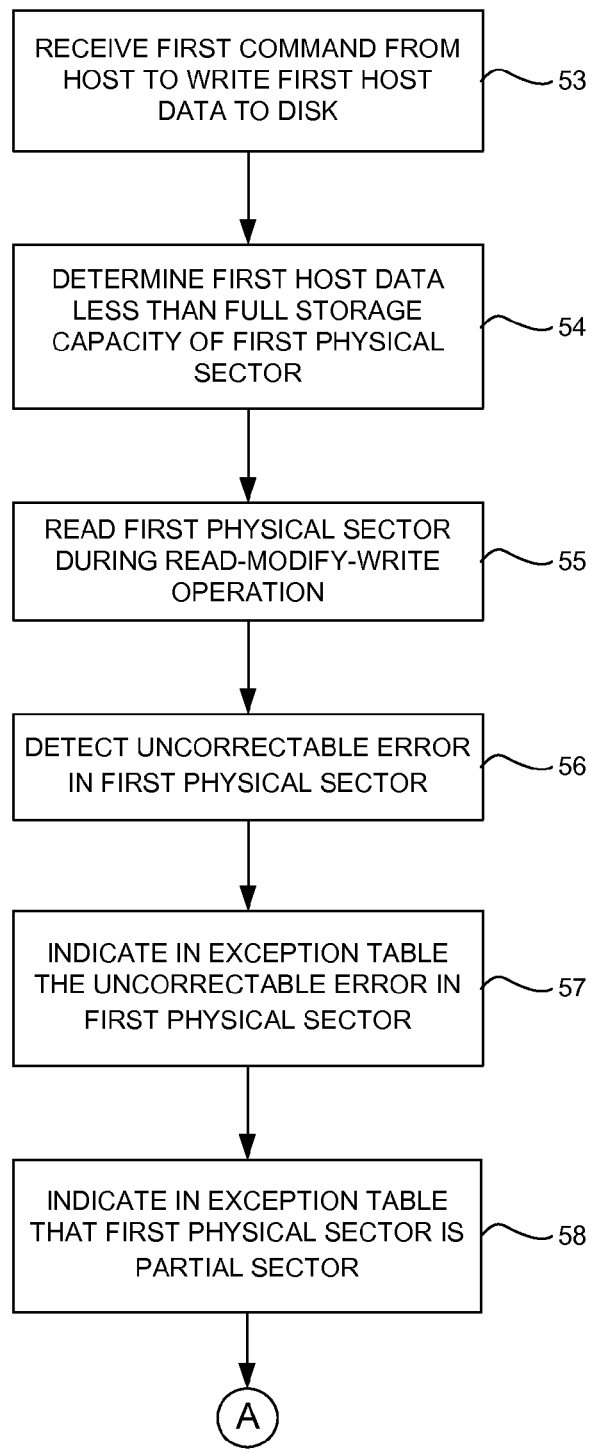
FIGS. 3A and 3B are flow diagrams according to an embodiment of the present invention wherein a physical sector on the disk is designated as a partial sector in the exception table after detection of an uncorrectable read error during execution of a read-modify-write operation, and wherein a partial sector bit map is created to indicate valid and invalid LBAs in the physical sector.

FIG. 3A is a flow diagram executed by the control circuitry 30 according to an embodiment of the present invention, wherein the control circuitry 30 receives a first command from the host to write first host data to the disk 4 (step 53), and determines that the first host data comprises less than a full storage capacity of a first physical sector 16 on the disk 4 (step 54). In an embodiment of the invention, the control circuitry 30 receives the first host data in the SM 36. In an embodiment in which the first physical sector 16 has a storage capacity corresponding to eight LBAs, the first host data corresponds to less than eight LBAs in the first physical sector 16. The control circuitry 30 reads the first physical sector 16 while performing a read-modify-write operation (step 55), and detects an uncorrectable error in the first physical sector 16 (step 56). In an embodiment of the present invention, the uncorrectable error is detected after the control circuitry 30 fails to correct a read error in the first physical sector 16 by performing an error recovery process, such as an ECC error recovery. The uncorrectable error can be, for example, an uncorrectable ECC error.

In the embodiment of the invention shown in FIG. 3A, the control circuitry 30 indicates in the exception table 38 the occurrence of the uncorrectable error in the first physical sector 16 (step 57), and also indicates in the exception table 38 that the first physical sector 16 is a partial sector (step 58). In one embodiment, the control circuitry 30 creates a new record in the exception table 38 corresponding to the first physical sector, wherein the new record includes the first LBA of the first physical sector, an indication that the first physical sector 16 has an uncorrectable error, and an indication that the first physical sector 16 is a partial sector. In an embodiment in which the first physical sector already has a record in the exception table 38 because it has been relocated to the reserved area 12 of the disk 4, the control circuitry 30 updates the existing record in the exception table 38 to include an indication that the first physical sector 16 has an uncorrectable error, and an indication that the first physical sector 16 is a partial sector.

Figure 3B:
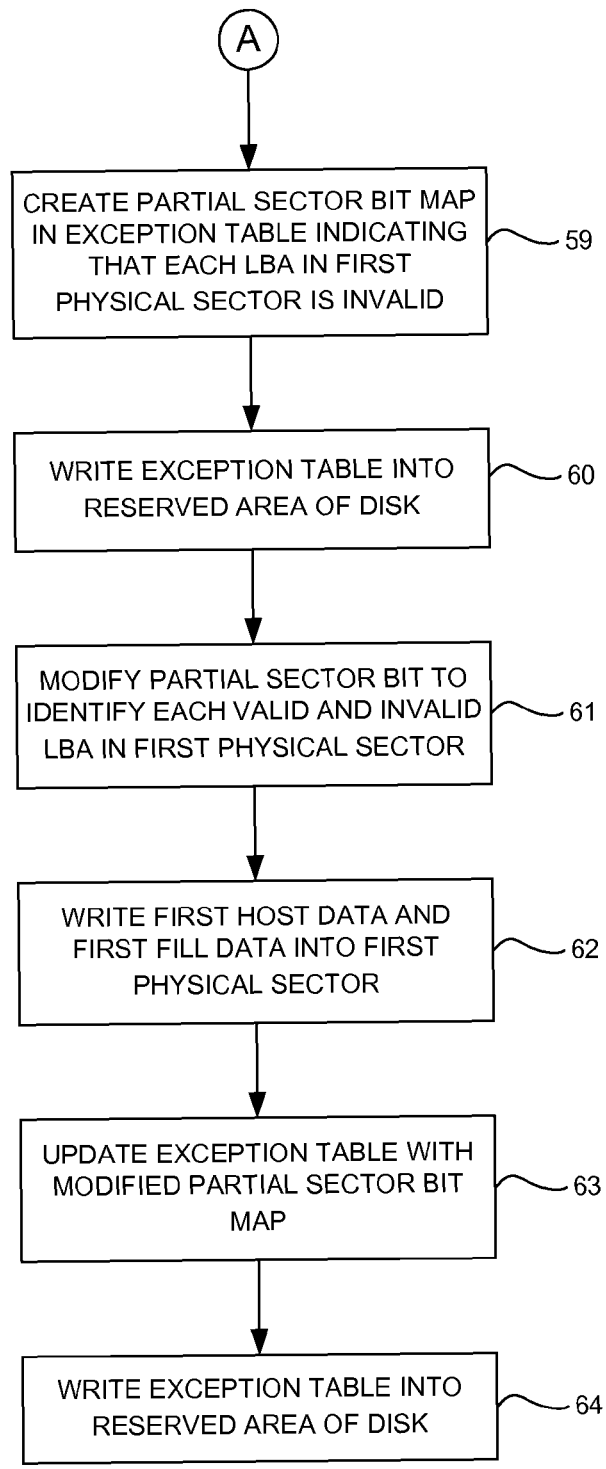

FIG. 3B is a flow diagram according to an embodiment of the present invention that extends the flow diagram of FIG. 3A. In the embodiment of FIG. 3B, the control circuitry 30 creates a partial sector bit map in the exception table 38 indicating that each LBA in the first physical sector is invalid (step 59), and writes the exception table 38 into the reserved area 12 of the disk 4 (step 60). In one embodiment, the partial sector bit is stored in the exception table 38 in a format wherein the most significant bit corresponds to the lowest value LBA in the physical sector 16. The control circuitry 30 can indicate that each LBA in the first physical sector is invalid, for example, by forming a clear bit having a value of 0 in a corresponding location in the partial sector bit map for each LBA. In an embodiment in which the partial sector bit map is not included in the exception table 38, the control circuitry 30 writes the partial sector bit map and the exception table 38 into the reserved area 12 of the disk 4. By writing the exception table 38 and the partial sector bit map to the disk 4, the indication that the first physical sector 16 has an uncorrectable error will be preserved if a power loss occurs.

In the embodiment of the invention in FIG. 3B, the control circuitry 30 modifies the partial sector bit map to identify each valid and each invalid LBA in the first physical sector (step 61), and writes the first host data and first fill data into the first physical sector 16 on the disk 4 (step 62). In one embodiment, the control circuitry 30 writes exception table 38 into the SM 36, modifies the corresponding partial sector bit map in the exception table 38 by indicating each LBA corresponding to the first host data as valid and each LBA that does not correspond to the first host data as invalid, and writes the first host data and first fill data from the SM 36 into the first physical sector 16. The first fill data represents invalid readable data and corresponds to the invalid LBAs in the first physical sector 16. After the first host data and the first fill data have been written into the first physical sector 16, the control circuitry 30 updates the exception table 38 with the modified partial sector bit (step 63), and writes the exception table 38 into the reserved area 12 of the disk 4.

Figure 4:
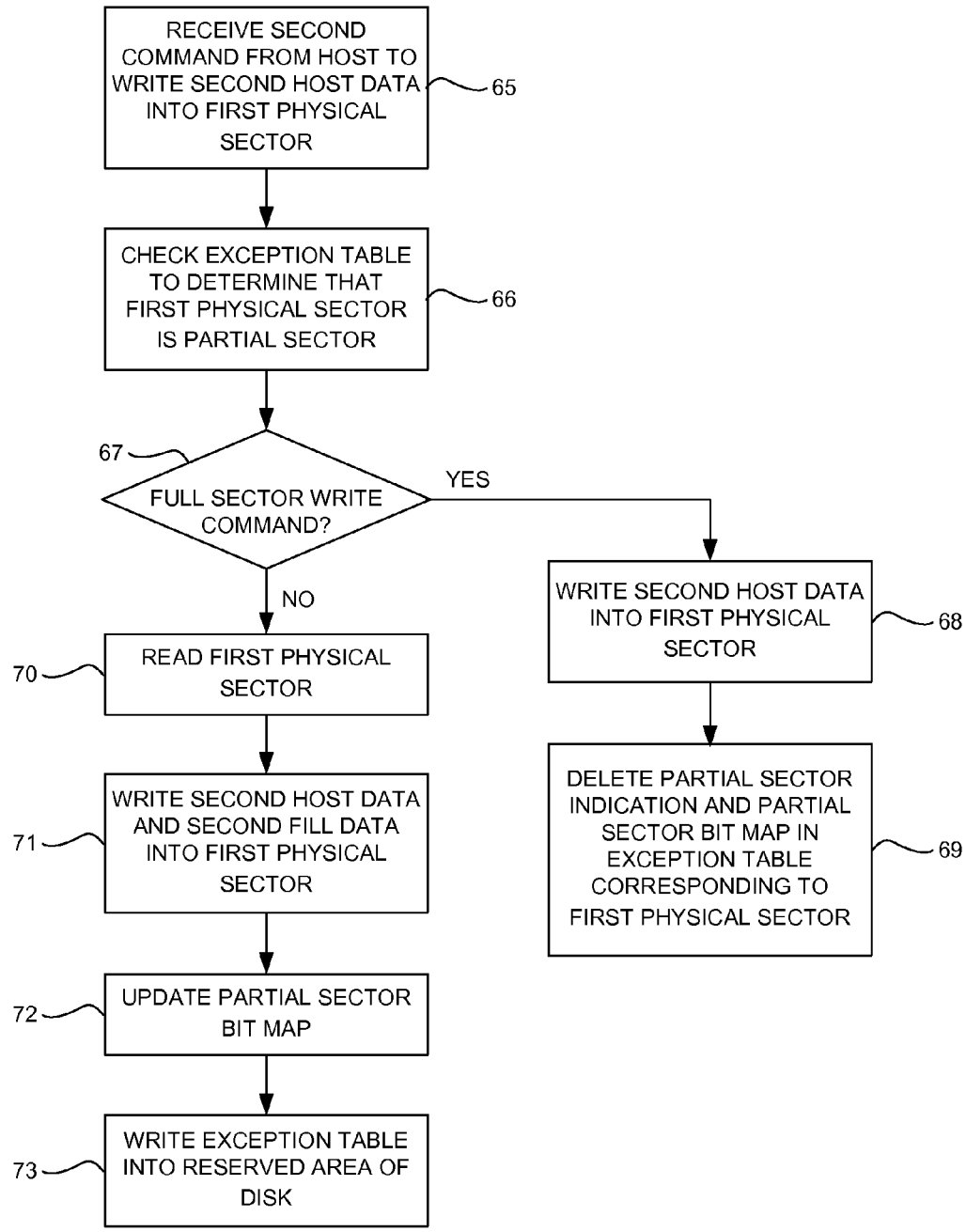
FIG. 4 is a flow diagram according to an embodiment of the present invention wherein host data and fill data are written to a physical sector on the disk after the determining that the physical sector is a partial sector, and where an associated partial sector bit map is updated to indicate valid and invalid LBAs in the physical sector.

FIG. 4 is a flow diagram executed by the control circuitry 30 according to an embodiment of the present invention, wherein the control circuitry 30 receives a second command from the host to write second host data into the first physical sector 16 (step 65). The control circuitry 30 checks the exception table 38 to determine that the first physical sector is a partial sector (step 66), and determines whether the second command is a full sector write command (i.e., the second host data corresponds to the full storage capacity of the first physical sector 16) (step 67). If the second command is a full sector write command, the control circuitry 30 writes the second host data into the first physical sector 16 (step 68), and deletes the partial sector indication and partial sector bit map in the exception table 38 corresponding to the first physical sector 16 (step 69).

In the embodiment of the invention in FIG. 4, if the second command is not a full sector write command (i.e., the second host data corresponds to less than the full storage capacity of the first physical sector 16), the control circuitry 30 reads the first physical sector 16 (step 70). In one embodiment, the control circuitry 30 reads the first physical sector 16 and writes the corresponding stored data from the first physical sector 16 in the SM 36. In the embodiment in FIG. 4, the control circuitry 30 writes the second host data and second fill data into the first physical sector 16 (step 71), and updates the corresponding partial sector bit map by indicating as valid each LBA in the first physical sector 16 that corresponds to the second host data (step 72). In one embodiment, the control circuitry 30 writes the second host data and the second fill data from the SM 36 into the first physical sector 16.

The second fill data corresponds to any previous invalid LBAs in the first physical sector 16 that remain invalid because they were not overwritten by the second host data. In the embodiment in FIG. 4, the control circuitry 30 writes the exception table 38, which includes the updated partial sector bit map, into the reserved area 12 of the disk 4 (step 73). In an embodiment in which the exception table 38 does not include the updated partial sector bit map, the control circuitry 30 writes the exception table 38 and the updated partial sector bit map into the reserved area 12 of the disk 4.

Figure 5A:
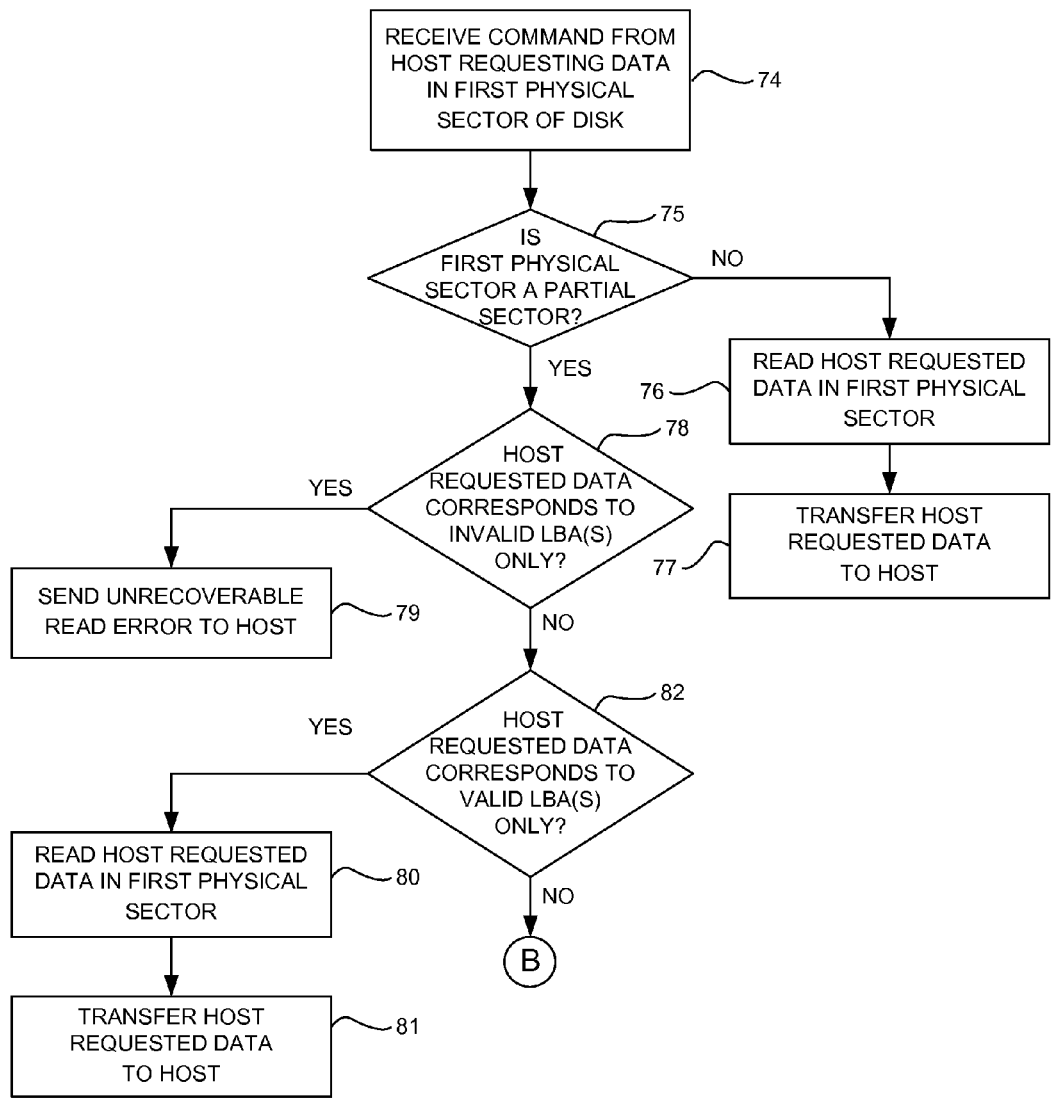
FIGS. 5A and 5B are flow diagrams according to an embodiment of the present invention wherein a response to a host command requesting data stored in a physical sector is provided by initially determining whether the physical sector is a partial sector, and if so, determining whether the host requested data corresponds to invalid and/or valid LBAs in the physical sector.

FIG. 5A is a flow diagram executed by the control circuitry 30 according to an embodiment of the present invention, wherein the control circuitry 30 receives a command from the host requesting data stored in the first physical sector 16 (step 74), and determines if the first physical sector 16 is a partial sector (step 75). In an embodiment of the invention, the control circuitry 30 determines if the first physical sector 16 is a partial sector by checking the exception table 38 and determining if the first physical sector 16 is indicated as a partial sector. If the first physical sector 16 is not a partial sector, the control circuitry 30 reads the requested data in the first physical sector 16 (step 76), and transfers the requested data to the host (step 77).

In the embodiment in FIG. 5A, if the first physical sector 16 is a partial sector, the control circuitry 30 determines if the host requested data in the first physical sector 16 corresponds to only invalid LBA(s) (i.e., the host requested data is invalid) (step 78). In an embodiment of the invention, the control circuitry 30 determines if the host requested data corresponds to only invalid LBA(s) by checking the associated partial sector bit map in the exception table 38. If the host requested data corresponds to only invalid LBA(s), the control circuitry 30 sends an unrecoverable read error to the host (step 79). In the embodiment in FIG. 5A, if the host requested data does not correspond to only invalid LBA(s), the control circuitry 30 determines if the host requested data corresponds to only valid LBA(s) (step 82). In an embodiment of the invention, the control circuitry 30 checks the appropriate indication(s) in associated partial sector bit map to determine if the host requested data corresponds to only valid LBA(s). If the host requested data corresponds to only valid LBA(s), the control circuitry 30 reads the host requested data in the first physical sector (step 80), and transfers the host requested data to the host (step 81).

Figure 5B:
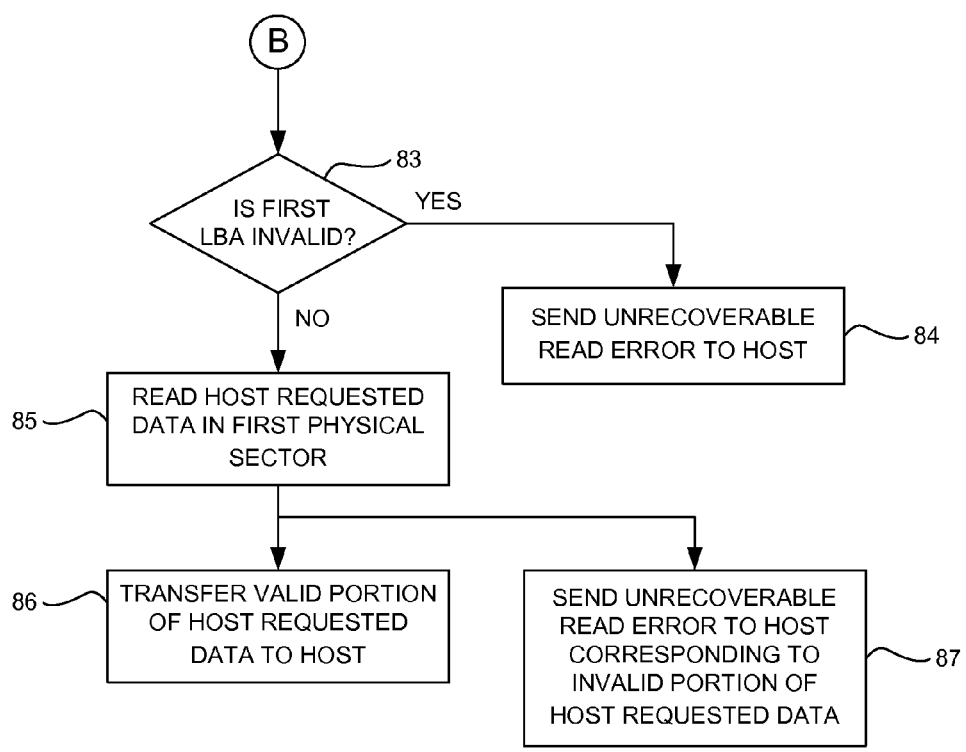

FIG. 5B is a flow diagram according to an embodiment of the present invention that extends the flow diagram of FIG. 5A. In the embodiment in FIG. 5B, if the host requested data in the first physical sector 16 does not correspond to only valid LBA(s) (as determined in step 82 in FIG. 5A), the control circuitry 30 determines if the first LBA corresponding to the host requested data is invalid (step 83). In an embodiment of the invention, the control circuitry 30 checks the appropriate indication in the corresponding partial sector bit map to determine if the first LBA is invalid. If the first LBA is invalid, the control circuitry 30 sends an unrecoverable read error to the host (step 84). If the first LBA corresponding to the host requested data is valid, the control circuitry 30 transfers the valid portion of the host requested data to the host (step 86), and sends an unrecoverable read error to the host corresponding to the invalid portion of the host requested data. The unrecoverable read error can be, for example, an unrecoverable ECC error.

It is noted that the steps in the flow diagrams in FIGS. 3A, 3B, 4, 5A and 5B are shown in a particular order to illustrate respective embodiments of the invention. In other embodiments, the steps in the flow diagrams in FIGS. 3A, 3B, 4, 5A and 5B may be performed in a different order.

Any suitable control circuitry 30 may be employed in the embodiments of the present invention, such as any suitable integrated circuit or circuits. For example, the control circuitry 30 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 30 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 4 and read into a volatile semiconductor memory when the disk drive is powered on. In yet another embodiment, the control circuitry 30 comprises suitable logic circuitry, such as state machine circuitry.

What is claimed is:

1. A disk drive comprising:
   a disk comprising a host addressable area and a reserved area, the host addressable area comprising a plurality of physical sectors, each physical sector associated with a plurality of logical block addresses (LBAs);
   an exception table stored in the reserved area;
   a head actuated radially over the disk to write data to the disk; and
   control circuitry coupled to the head, the control circuitry operable to:
      receive a first command from the host to write first host data into a first physical sector on the disk, wherein the first host data comprises an amount of data less than a full storage capacity of the first physical sector;
      detect an uncorrectable error while reading the first physical sector during a read-modify-write operation; and
      when an uncorrectable error is detected, indicate in the exception table that the first physical sector is a partial sector including valid and invalid LBAs, wherein the valid LBAs correspond to valid host data, and the invalid LBAs correspond to invalid host data.

2. The disk drive as recited in claim 1, wherein the control circuitry is further operable to:
   create a partial sector bit map in the exception table indicating that each LBA in the first physical sector is invalid;
   write the exception table into the reserved area of the disk;
   modify the partial sector bit map to identify each LBA in the first physical sector as invalid or valid;
   write the first host data and first fill data into the first physical sector;
   update the exception table with the modified partial sector bit map; and
   write the exception table into the reserved area of the disk.

3. The disk drive as recited in claim 2, wherein the control circuitry is further operable to:
   receive a second command from the host to write second host data into the first physical sector on the disk;
   check the exception table to determine that the first physical sector is a partial sector;
   read the first physical sector and determine that the second host data corresponds to only one or more invalid LBAs in the first physical sector;
   update the modified partial sector bit map in the exception table to identify the one or more invalid LBAs as valid;
   write the second host data and second fill data into the first physical sector; and
   write the exception table into the reserved area of the disk.

4. The disk drive as recited in claim 2, wherein the control circuitry is further operable to:
   receive a second command from the host to write second host data into the first physical sector on the disk;
   check the exception table to determine that the first physical sector is a partial sector;
   read the first physical sector and determine that the second host data corresponds to only one or more valid LBAs in the first physical sector; and
   write the second host data and second fill data into the first physical sector.

5. The disk drive as recited in claim 2, wherein the control circuitry is further operable to:
   receive a second command from the host to write second host data into the first physical sector on the disk;
   check the exception table to determine that the first physical sector is a partial sector;
   read the first physical sector and determine that the second host data corresponds to one or more valid LBAs and one or more invalid LBAs in the first physical sector;
   update the modified partial sector bit map in the exception table to identify the one or more invalid LBAs as valid;
   write the second host data and second fill data into the first physical sector; and
   write the exception table into the reserved area of the disk.

6. The disk drive as recited in claim 2, wherein the control circuitry is further operable to:
   receive a second command from the host to write second host data into the first physical sector on the disk;
   check the exception table to determine that the first physical sector is a partial sector and that the second host data corresponds to all valid and invalid LBAs in the first physical sector;
   write the second host data into the first physical sector; and
   delete, in the exception table, the indication that the first physical sector is a partial sector and the modified partial sector bit map.

7. The disk drive as recited in claim 2, wherein the control circuitry is further operable to:
   receive a second command from the host requesting data in the first physical sector on the disk;
   check the exception table to determine that the first physical sector is a partial sector and that the host requested data corresponds to only one or more invalid LBAs in the first physical sector; and
   send an unrecoverable read error to the host.

8. The disk drive as recited in claim 2, wherein the control circuitry is further operable to:
   receive a second command from the host requesting data in the first physical sector on the disk;
   check the exception table to determine that the first physical sector is a partial sector and that a first portion of the host requested data corresponds to one or more valid LBAs in the first physical sector and a second portion of the host requested data corresponds to one or more invalid LBAs in the first physical sector;
   read the first physical sector and transfer the first portion of the host requested data to the host; and
   send an unrecoverable read error to the host corresponding to the second portion of the host requested data.

9. The disk drive as recited in claim 2, wherein the control circuitry is further operable to:
   receive a second command from the host requesting data in the first physical sector on the disk;
   check the exception table to determine that the first physical sector is a partial sector and that the host requested data corresponds to only one or more valid LBAs in the first physical sector; and
   read the first physical sector and transfer the host requested data to the host.

10. The disk drive as recited in claim 2, wherein the control circuitry is further operable to:

receive a second command from the host requesting data in a second physical sector on the disk;
check the exception table to determine that the second physical sector is not a partial sector; and
read the second physical sector and transfer the host requested data to the host.

11. The disk drive as recited in claim 1, wherein the control circuitry is further operable to:
create a partial sector bit map indicating that each LBA in the first physical sector is invalid;
write the exception table and the partial sector bit map into the reserved area of the disk;
modify the partial sector bit map to identify each LBA in the first physical sector as invalid or valid;
write the first host data and first fill data into the first physical sector; and
write the modified partial sector bit map to the disk.

12. The disk drive as recited in claim 1, wherein each LBA in the first physical sector has a 512 byte size and the first physical sector has a 4 kilobyte size.

13. The disk drive as recited in claim 1, wherein the uncorrectable error is an uncorrectable error correcting code (ECC) error.

14. A method of operating a disk drive, the disk drive comprising a disk, the disk comprising a host addressable area and a reserved area, the host addressable area comprising a plurality of physical sectors, each physical sector associated with a plurality of LBAs, an exception table stored in the reserved area, a head actuated radially over the disk to write data to the disk, the method comprising:
receiving a first command from the host to write first host data into a first physical sector on the disk, wherein the first host data comprises an amount of data less than a full storage capacity of the first physical sector;
detecting an uncorrectable error while reading the first physical sector during a read-modify-write operation; and
when an uncorrectable error is detected, indicating in the exception table that the first physical sector is a partial sector including valid and invalid LBAs, wherein the valid LBAs correspond to valid host data, and the invalid LBAs correspond to invalid host data.

15. The method as recited in claim 14, further comprising:
creating a partial sector bit map in the exception table indicating that each LBA in the first physical sector is invalid;
writing the exception table into the reserved area of the disk;
modifying the partial sector bit map to identify each LBA in the first physical sector as invalid or valid;
writing the first host data and first fill data into the first physical sector;
updating the exception table with the modified partial sector bit map; and
writing the exception table into the reserved area of the disk.

16. The method as recited in claim 15, further comprising:
receiving a second command from the host to write second host data into the first physical sector on the disk;
checking the exception table to determine that the first physical sector is a partial sector;
reading the first physical sector and determining that the second host data corresponds to only one or more invalid LBAs in the first physical sector;
updating the modified partial sector bit map in the exception table to identify the one or more invalid LBAs as valid;
writing the second host data and second fill data into the first physical sector; and
writing the exception table into the reserved area of the disk.

17. The method as recited in claim 15, further comprising:
receiving a second command from the host to write second host data into the first physical sector on the disk;
checking the exception table to determine that the first physical sector is a partial sector;
reading the first physical sector and determining that the second host data corresponds to only one or more valid LBAs in the first physical sector; and
writing the second host data and second fill data into the first physical sector.

18. The method as recited in claim 15, further comprising:
receiving a second command from the host to write second host data into the first physical sector on the disk;
checking the exception table to determine that the first physical sector is a partial sector;
reading the first physical sector and determining that the second host data corresponds to one or more valid LBAs and one or more invalid LBAs in the first physical sector;
updating the modified partial sector bit map in the exception table to identify the one or more invalid LBAs as valid;
writing the second host data and second fill data into the first physical sector; and
writing the exception table into the reserved area of the disk.

19. The method as recited in claim 15, further comprising:
receiving a second command from the host to write second host data into the first physical sector on the disk;
checking the exception table to determine that the first physical sector is a partial sector and that the second host data corresponds to all valid and invalid LBAs in the first physical sector;
writing the second host data into the first physical sector; and
deleting, in the exception table, the indication that the first physical sector is a partial sector and the modified partial sector bit map.

20. The method as recited in claim 15, further comprising:
receiving a second command from the host requesting data in the first physical sector on the disk;
checking the exception table to determine that the first physical sector is a partial sector and that the host requested data corresponds to only one or more invalid LBAs in the first physical sector; and
sending an unrecoverable read error to the host.

21. The method as recited in claim 15, further comprising:
receiving a second command from the host requesting data in the first physical sector on the disk;
checking the exception table to determine that the first physical sector is a partial sector and that a first portion of the host requested data corresponds to one or more valid LBAs in the first physical sector and a second portion of the host requested data corresponds one or more invalid LBAs in the first physical sector;
reading the first physical sector and transferring the first portion of the host requested data to the host; and
sending an unrecoverable read error to the host corresponding to the second portion of the host requested data.

22. The method as recited in claim 15, further comprising:
receiving a second command from the host requesting data in the first physical sector on the disk;
checking the exception table to determine that the first physical sector is a partial sector and that the host requested data corresponds to only one or more valid LBAs in the first physical sector; and reading the first physical sector and transferring the host requested data to the host.

23. The method as recited in claim 15, further comprising:

receiving a second command from the host requesting data in a second physical sector on the disk;

checking the exception table to determine that the second physical sector is not a partial sector; and reading the second physical sector and transferring the host requested data to the host.

24. The method as recited in claim 14, further comprising:

creating a partial sector bit map indicating that each LBA in the first physical sector is invalid;

writing the exception table and the partial sector bit map into the reserved area of the disk;

modifying the partial sector bit map to identify each LBA in the first physical sector as invalid or valid;

writing the first host data and first fill data into the first physical sector; and writing the modified partial sector bit map to the disk.

25. The method as recited in claim 14, wherein each LBA in the first physical sector has a 512 byte size and the first physical sector has a 4 kilobyte size.

26. The method as recited in claim 14, wherein the uncorrectable error is an uncorrectable ECC error.

* * * * *